Oct. 17, 1961     N. F. RITCHEY     3,005,104
METHOD AND MEANS FOR TESTING METALS
Filed Sept. 17, 1958
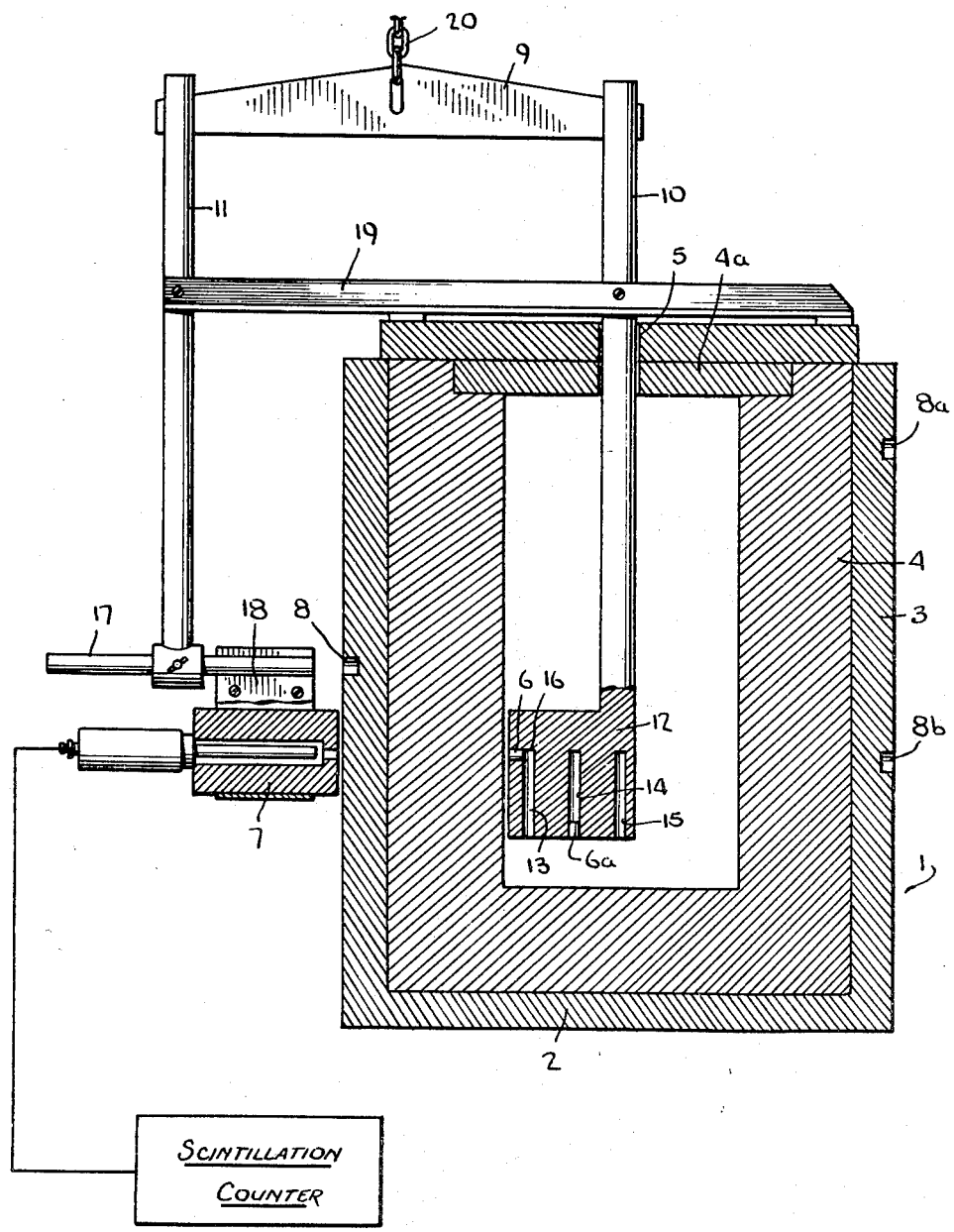
INVENTOR.
NEIL F. RITCHEY
BY
Norman B. Holland
ATTORNEY

United States Patent Office 3,005,104
Patented Oct. 17, 1961

3,005,104
METHOD AND MEANS FOR TESTING METALS
Neil F. Ritchey, Westtown, Pa., assignor to Knapp Mills Incorporated, Long Island City, N.Y., a corporation of New York
Filed Sept. 17, 1958, Ser. No. 761,652
10 Claims. (Cl. 250—106)

The present invention relates to an improved method and mechanism for testing metal for flaws and more particularly to an improved method and mechanism for testing the walls of lead lined shielding containers for storing radioactive material to determine whether or not any flaws are present therein.

Uranium, radium and other radioactive substances which emit dangerous radiation, are usually stored in containers which are lined with lead to form a shield which the rays cannot penetrate. Since prolonged exposure to such radiation rays may be injurious to human health it is important that the lining of the containers be free from voids or other flaws. If a void or other flaw exists in the lead container, radiation will seep out through this weakened point in the lead shield and thus endanger the health of persons who are working where such radioactive materials are stored.

It therefore becomes important to test the walls of these lead lined containers before they are used for shielding purposes to make certain that they have no flaws in them. At present it is a common practice to test such containers by placing a radioactive source, such as uranium, within the container and placing a radiation detecting mechanism on the outside of the container opposite the radiation source. The radiation source and the detector are moved synchronously over the walls of the container and the amount of radiation which penetrates the walls of the container is detected by the detector and measured. If the radiation detected by the detector remains constant, then it is assumed that there are no voids or other flaws in the walls of the container and the container can be safely used. However, if the radiation detected by the detector increases, then a flaw is deemed present in the container wall and the container cannot be used until the flaw is corrected.

I have discovered that in practicing this method, stray radiation coming from the radioactive source within the container or from some other outside source will effect the reading on the radiation detector. Heretofore it has not been possible to determine whether an increase in the radiation reading detected by the detector was due to a flaw in the container or was due to stray radiation from other sources. Stray radiation from outside sources prevents accurate calibration of the radiation detector necessary to obtain accurate readings.

The present invention overcomes these problems and provides an improved method of testing the walls of containers which will permit accurate determination of whether or not any stray radiation from outside sources is impairing the results.

Another object of the present invention is to provide an improved method wherein the detector can be quickly checked as to the accuracy of the readings.

Another object of the present invention is the provision of an improved method which minimizes the possibility of errors occurring during the detection of voids or other flaws in container walls.

A further object of the present invention is to provide an improved mechanism for detecting voids or other flaws in container walls.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein the single figure in the drawings illustrates a diagrammatical elevational view showing the operation of the method of the present invention and a preferred embodiment of the mechanism used with the method.

Referring more particularly to the drawings, the method of the present invention is illustrated in testing a lead lined container 1 to determine whether or not any voids or other flaws are present therein. The container 1 is provided with a bottom 2 and upstanding walls 3 which are coated with a lead lining 4. The thickness of the lead lining 4 should be sufficient to prevent any harmful radioactive radiations from penetrating therethrough. In order to minimize stray radiation during the testing, a cover 4a is mounted on the container to shield any stray radiation coming through the open end of the container. The cover 4a is provided with an opening 5 therein to permit a holder for the radioactive source to enter the container.

The preferred method of testing the container comprises placing a radioactive source 6, such as uranium, on the inside of the container. The radioactive source 6, is preferably a source which emits gamma rays. For example, uranium and radium, which are two substances which emit gamma rays, may be used in practicing the present invention. However, it will be understood that the present invention is not limited to the use of radioactive sources emitting gamma rays nor to the use of uranium or radium as a source and that it is within the scope of the present invention that any source which emits penetrating radiation may be used to practice the present invention.

A radiation detector 7 is placed on the outside of the container opposite the radioactive source 6 to detect radiations from the source 6 which penetrate the container walls. The preferred type of detector used to detect the radiation is a multiplier type known as a scintillation counter type of detector. However, a Geiger-Mueller type of detector or any other suitable or well-known radiation detector may be used if it will detect the objectionable rays.

The radioactive source 6 and the detector 7 are so positioned with respect to each other that when they are moved in registry with each other over the walls of the container so that if there is a void or other flaw in the container wall, the radiation coming through the container wall will increase and the radiation detected by the detector 7 will show an increase.

In order to be certain that any increase in the radiation detected by the detector 7 is caused by a void or other flaw in the wall of the container and not from any stray radiation from other sources, a test cavity 8 is bored in the container wall. The test hole 8 bored in the container is of such depth so that the radiation penetrating the container wall at the test cavity 8 is predetermined. Hence, when the radioactive source 6 and the detector 7 are placed over the test cavity 8 the reading must always be constant and if the radiation reading of the detector at the test hole 8 increases, it will readily show that stray radiation from an outside source is affecting the readings of the detector 7.

The test hole 8 also permits the detector 7 to be calibrated. This is done by placing the radioactive source on the test hole 8 and obtaining a reading on the detector 7. Using this reading as a standard, the detector 7 can be calibrated accordingly.

While only a single test hole 8 has been shown in the drawings, it will be understood that several test holes can be bored in the container at different places on the container walls to permit checking the detector for accuracy at various points on the container. For example, additional test cavities 8a and 8b may also be bored in the opposite wall of the container. This facilitates checking the detector readings since the test cavities are near that place in the container wall that is being tested and it is not necessary to move the detector back to the cavity 8 when a reading check is to be made.

The preferred steps in utilizing the method of the present invention is to first place the detector 7 outside the container walls and to place the radioactive source within the container opposite the detector 7. The two are moved over the area where a test hole is to be drilled and a reading is taken of this area. The test cavity 8 is then drilled and a reading taken over the cavity 8. The difference between the two readings represents the limits of acceptance for inspection. The detector 5 is then calibrated by using the radiation reading at the test hole 8 as a standard.

After the detector 7 has been calibrated, the radioactive source 6 and the detector 7 are moved synchronously over the container walls. If there are no voids or other flaws in the container walls, the radiation readings will remain constant. However, if there is a flaw in the container wall, the radiation readings of the detector 7 will increase.

In order to make certain that no stray radiation from the radiation source 6 within the containers or from some outside sources is being detected by the detector 7, the radiation source 6 and the detector 7 are periodically moved over the test hole 8 to make certain that the reading at the test hole 8 agrees with the initial reading taken at the test hole 8 before the testing began. If the two readings agree, then it is certain that no stray radiation is affecting the detector. However, if the second reading shows an increased radiation, then it is certain that stray radiation is affecting the detector.

The drawings illustrate a preferred mechanism for maintaining detector 7 and the source of radiation 6 in registry and for moving them synchronously over the container walls. A yoke 9 suspended from a chain 20 is provided with a pair of arms 10 and 11 depending therefrom to straddle the container wall 3.

The arm 10 within the container is provided with a holder 12 at its lower end having a plurality of channels 13, 14 and 15 adapted to receive the radioactive source 6. The channel 13 has a portion 16 perpendicular to the walls of the container to permit radiation from the source 6 to strike the walls 3 of the container. The channels 14 and 15 open downwardly toward the bottom 2 of the container so that a source of radiation 6a may be inserted therein to direct radiation toward the bottom of the container when the bottom 2 of the container is to be tested.

The arm 11 outside the container is provided with a journal bar 17 on which a holder 18 for the radiation detector 7 is adapted to slide to move the detector 7 adjacent to the walls of the container.

The arms 10 and 11 are held in spaced alignment with each other by a cross-bar 19 so that the radioactive source 4 and the detector 5 will be moved synchronously over the walls of the container by a single movement of the yoke 9.

While the present invention has been described by reference to a shielding container, it will be understood that the invention may also be used to test shielding materials of varying size, shape or configuration.

It will be seen from the above that the present invention provides an improved method and mechanism for detecting flaws in container which will permit accurate determination of whether or not any stray radiation from outside sources is being detected by the detector. The present invention will also minimize the possibility of error occurring during the detection of voids or other flaws in container walls and will permit the detector to be easily calibrated to give accurate readings.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of testing a thickness of material as an effective barrier to radiation, which method comprises forming a defect having a predetermined radiation penetrability in the material to be tested to be used as a means for checking the accuracy of the testing operation and measuring periodically in the testing operation the radiation through the material at said known defect to be sure that the testing operation is functioning properly.

2. The method of testing a thickness of material as an effective barrier to radiation by utilizing a radiation source on one side and a radiation detector on the opposite side of said material, which method comprises forming a defect having a predetermined radiation penetrability in the material to be tested to be used as a means for checking the accuracy of the testing operation and measuring periodically in the testing operation with said source and said detector the radiation through the material at said known defect to be sure that the testing operation is functioning as it should.

3. The method of testing a wall of a container as an effective barrier to radiation, which comprises forming a cavity in the wall of the container to be tested to provide a defect to be utilized as a standard for checking the accuracy of the testing operation, determining the radiation penetrability of said defect, and measuring the effectiveness of the wall as a barrier by utilizing a source of radiation on one side of the wall and a radiation detector on the other side of the wall at various points over the area of the wall and measuring periodically the radiation through the wall at said cavity to be sure that the readings at other portions are accurate.

4. The method of testing a thickness of material as an effective barrier to radiation, which method comprises forming a defect having a predetermined radiation penetrability in the material to be tested to be used as a means for checking the accuracy of the readings at other positions on the area of the material and measuring periodically in the testing operation through the material at said known defect to guard against inaccurate readings occasioned by stray radiation which does not pass directly through the wall of a container from the radiation source to the counter but comes from another source to another direction.

5. The method of testing an article for flaws which comprises reducing the thickness of the article to be tested at a predetermined area on said article, determining the penetrability of radiation through article at said area of reduced thickness, placing a source of radiation on one side of the article, placing a radiation detector on the other side of the article opposite said radiation source, moving said source of radiation and said radiation detector over the surface of the article to permit the detector to detect the radiations coming through the article, placing said radiation source and said detector over said area of reduced thickness, and comparing the radiation detected by the detector at said area of reduced thickness to the determined radiation penetrability of the reduced thickness area to determine whether the detector is detecting any stray radiation from sources other than said radiation sources.

6. The method of detecting flaws in metal containers having lead-lined walls which comprises forming a test cavity in the container wall to be tested, the container wall having a predetermined radiation reading at said test cavity, placing a radiation source on one side of said container wall, placing a radiation detector on the other side of said container wall opposite said radiation source, moving said source of radiation and said detector over the surface of said container wall to detect the radiations coming through the container wall, placing said radiation source and said detector over said test cavity, and comparing the radiation detected by the detector at said test cavity to the predetermined radiation reading to determine whether said detector is operating correctly.

7. The method of detecting flaws in the walls of lead lined containers which comprises forming a test cavity in the wall of the container to be tested, placing a radiation source within said container, placing a radiation detector on the outside of said container opposite said radiation source, placing said detector and said radiation source at said test cavity, taking an original radiation reading at said test cavity, calibrating the detector using the original radiation reading as a standard, moving said source of radiation and said detector synchronously over the surface of said wall to detect radiations coming through the wall, placing said radiation source and said detector over said test cavity and comparing the radiation reading at said test cavity to the original radiation reading to determine whether said readings by the detector are accurate.

8. The method of detecting flaws in the articles which comprises placing a radiation source on one side of the article and placing a radiation detector on the other side of said article opposite said radiation source, taking an initial reading of the radiation penetrating said article at a predetermined point on said article, moving said radiation source and said detector over the article to detect radiation penetrating said article, placing said radiation source and said detector over said predetermined point on said article, and comparing the radiation reading detected by the detector at said predetermined point with the initial reading taken to determine whether the readings of the detector are accurate.

9. A mechanism for detecting flaws in the walls of a container which comprises a cover adapted to be applied in closing relation to said container to prevent stray radiation from entering or leaving the container, said cover having an opening therein, means including a member extending through said opening for positioning a radiation source within the container and a radiation detector on the outside of said container opposite said source and maintaining said source and detector in fixed predetermined spaced relation, and means for moving said source and said detector synchronously over the container walls.

10. The method of detecting flaws in articles which comprises altering the thickness of the article to be tested at a predetermined area on the article, placing a radiation source on one side of the article and placing a radiation detector on the other side of said article opposite said radiation source, taking an initial reading of the radiation penetrating said article at said predetermined area of altered thickness on said article, moving said radiation source and said detector over the article to detect radiation penetrating said article, periodically placing said radiation source and said detector over said predetermined area of altered thickness on said article, and comparing the radiation reading detected by the detector at said predetermined area with the initial reading taken to determine whether the readings of the detector are accurate.

References Cited in the file of this patent

UNITED STATES PATENTS

| | | |
|---|---|---|
| 1,576,535 | Muir | Mar. 16, 1926 |
| 2,405,572 | Friedman | Aug. 13, 1946 |
| 2,501,174 | Herzog | Mar. 21, 1950 |
| 2,509,344 | Herzog | May 30, 1950 |
| 2,597,535 | Segre | May 20, 1952 |
| 2,759,108 | Molins | Aug. 14, 1956 |
| 2,831,980 | Howell | Apr. 22, 1958 |
| 2,915,640 | Grubel et al. | Dec. 1, 1959 |